June 15, 1965 K. F. FINEFIELD 3,188,767
SIGNALLING DEVICE FOR FISHING RODS
Filed Feb. 11, 1964
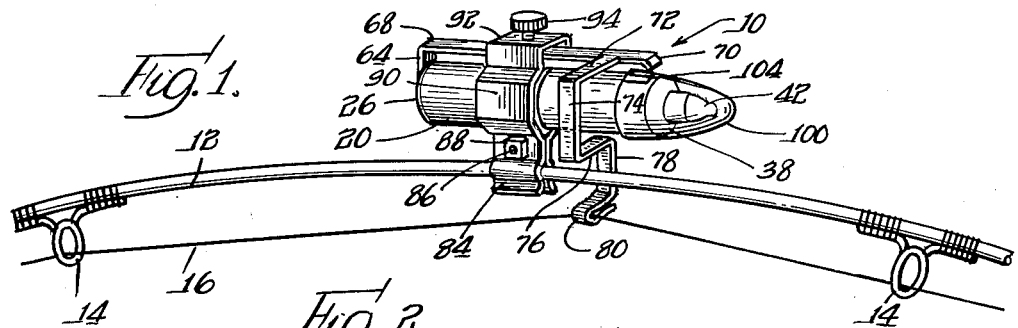
Fig. 1.
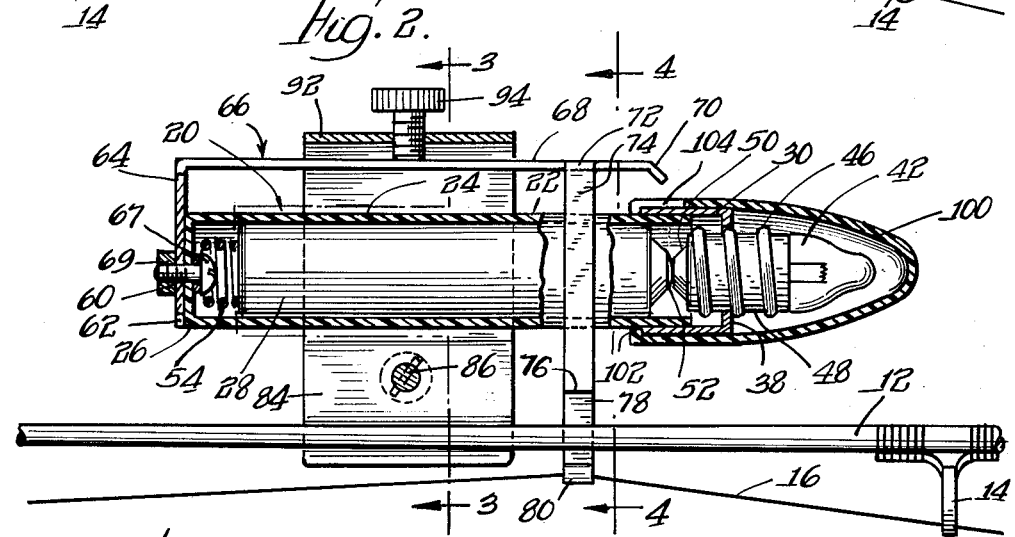
Fig. 2.
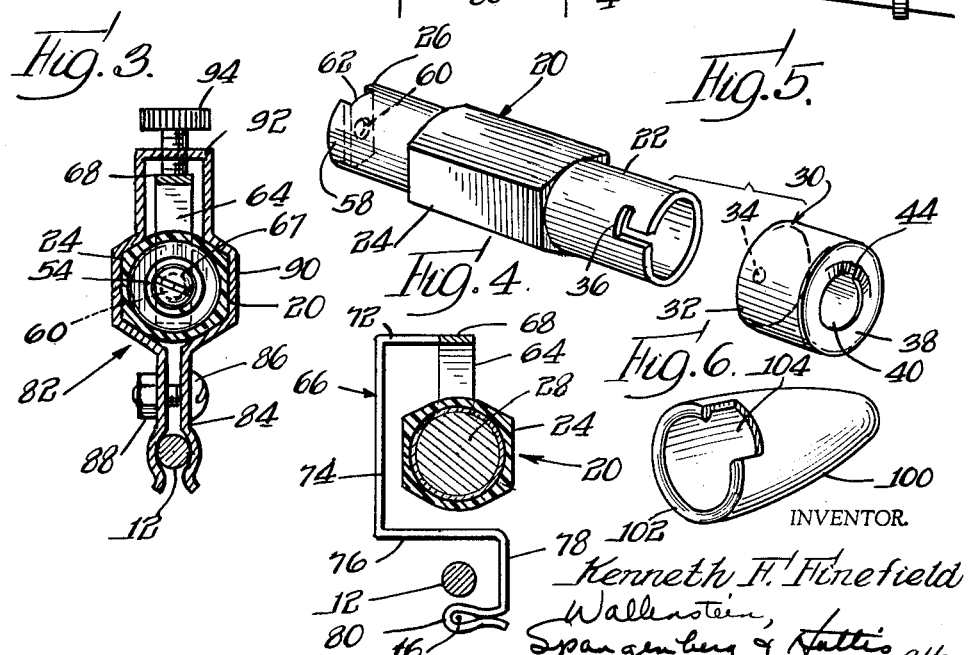
Fig. 3.
Fig. 4.
Fig. 5.
Fig. 6.
INVENTOR.
Kenneth F. Finefield
Wallenstein,
Spangenberg & Hattis Attys.

United States Patent Office 3,188,767
Patented June 15, 1965

3,188,767
SIGNALLING DEVICE FOR FISHING RODS
Kenneth F. Finefield, 1511 Eunice Ave., Joliet, Ill.
Filed Feb. 11, 1964, Ser. No. 344,036
7 Claims. (Cl. 43—17)

This invention relates to a device for attachment to a flexible fishing rod, the device being capable of producing a signal to indicate a bite or strike on a fish hook-bearing line associated with the rod.

Heretofore, signalling devices of the type with which the present invention is concerned usually have depended for their operation solely upon the tautening or tensioning of the fishing line to detect a bite or strike on the end of the line carrying the fish hook. In those few known instances wherein the tensioning of the line is not relied upon to activate the signalling device, vibrations transmitted to the fishing rod have been utilized to activate a sensitive vibratory switch element housed in the device, or, as in at least one instance, bending of the rod alone has been used to energize a device secured thereon. While such previously developed signalling devices generally perform satisfactorily under calm air and water fishing conditions, they have a tendency to erratic and unreliable performance under less than ideal weather and water conditions.

It is an object of the present invention to provide an improved signalling or detecting device for attachment to a flexible fishing rod which is capable of utilizing the combined action of the tensioning or tautening of the fishing line and the concomitant flexing or bending of the rod reliably and positively to produce a signal to indicate a bite or strike on the line under substantially any weather and water conditions.

It is also an object of the present invention to provide an improved signalling or detecting device for attachment to a flexible fishing rod which incorporates novel self-protecting signal actuating or switching means whereby excessive or abnormal, potentially damaging stresses or loads placed on the fishing line are effectively prevented from being transmitted to those portions of the signal actuating or switching means which primarily are responsible for the sensitive and reliable operation of the device.

It is a further object of the present invention to provide an improved signalling or detecting device for attachment to a fishing rod which can be easily, effectively and readily adjusted for sensitivity while in position on the rod to accommodate to substantially any conditions of weather and water, and/or type of fish sought, and which also can be easily, effectively and readily rendered inoperative as desired while on the rod or during storage.

It is another object of the present invention to provide an improved signalling or detecting device having the characteristics herein described which can be readily and easily attached and detached from a fishing rod, and which, due to its compact, lightweight construction, does not interfere with the maneuverability of the rod or line to which it is attached, or add appreciably to the weight of the rod.

Briefly, the improved signalling or detecting device of the present invention comprises a lightweight insulative casing or housing which contains a battery. Releasably attached to one end of the casing or housing is an electrically conductive cap or closure member which carries a bulb in electrical contact with the battery in the casing or housing. Unique resilient signal actuating or switch means is secured to the end of the casing or housing opposite to the end thereof which carries the cap or closure member. The signal actuating or switch means desirably has an electrical circuit completing portion which overlies and is spaced from the casing or housing, and extends substantially longitudinally thereof, terminating at a point adjacent the electrically conductive cap or closure member. The signal actuating or switch means further advantageously includes a fishing line engaging portion which partly surrounds a segment of the rod and provides a rod-engaging shoulder positioned above the rod and transverse to the longitudinal axis thereof. The rod-engaging shoulder of the signal actuating or switch means serves to prevent excessive, potentially damaging stresses or loads placed on the signal actuating or switch means from being transmitted to the electrical circuit completing portion thereof. This self-protecting feature of the signal actuating or switch means serves effectively to prevent the circuit completing portion of the signal actuating or switch means from being bent out of shape and thus preserves the sensitivity of the device in substantially any situation. A removable, insulative cover member is provided for the electrically conductive cap or closure member and the bulb. The cover member overlies the cap or closure member and can be rotated thereon to prevent the electrical circuit completing portion of the signal actuating or switch means from engaging the cap or closure member and thereby completing an electrical circuit to energize the bulb. The cover member thus provides a simple, effective means for rendering the device inoperative while still mounted on a fishing rod, or during storage. The device is conveniently attached to a fishing rod by means of a clamp, a portion of which overlies the circuit completing portion of the signal actuating or switch means. An adjustable screw desirably is provided on that portion of the clamp for regulating the relative distance between the circuit completing portion of the signal actuating or switch means and the electrically conductive cap or closure member. In this manner, the sensitivity of the device may be controlled in accordance with the desires of the user as dictated by weather and water conditions, and the biting or striking characteristics of the fish sought.

These and other objects, advantages and features of the invention will become apparent upon making reference to the specification to follow, the claims and the accompanying drawing, in which:

FIG. 1 is a fragmentary view in perspective of an embodiment of the device of this invention mounted in operative position on a flexible fishing rod;

FIG. 2 is an enlarged fragmentary side view in elevation, partly in section, of the embodiment of the device illustrated in FIG. 1;

FIG. 3 is a vertical sectional view taken substantially along line 3—3 of FIG. 2;

FIG. 4 is an enlarged end view, partly in section, of the embodiment of the device illustrated in FIG. 1 and taken substantially along the line 4—4 of FIG. 2;

FIG. 5 is an enlarged exploded view in perspective of the casing or housing and the end cap or closure member of the embodiment of the device illustrated in FIG. 1; and FIG. 6 is an enlarged view in perspective of the cover member for the cap or closure member and bulb of the device illustrated.

Referring now more particularly to the drawing, an embodiment of the signalling or detecting device of the present invention, designated generally by reference numeral 10, is mounted on a flexible fishing pole or rod 12 having line guides 14 and carrying a fishing line 16 which is threaded through the guides. A reel, not shown, may be attached to the pole or rod for winding and unwinding the line, and one or more fish hooks may be attached to the free end of the line for holding bait to lure fish. The pole or rod, the reel and the line may be of conventional construction and the specific features thereof do not form a part of the present invention.

The signalling or detecting device 10 includes a lightweight, substantially cylindrically shaped casing or housing 20 having an open-end portion 22 joined to an intermediate, straight-sided portion 24 which, in turn, is joined to a closed-end portion 26. The casing or housing 20 desirably is of unitary construction and is fabricated of a lightweight, electrically non-conductive material such as plastic, or the like. A battery 28, desirably of the small, pen-light type, is carried in the casing or housing 20 to provide a source of electrical energy.

A metal cap or closure member 30 is releasably secured on the open-end 22 of the casing or housing 20 by providing the side wall 32 of the member 30 with an inwardly extending pin 34 which is received by and engaged in a slot 36 which together form a bayonet joint. The end wall 38 of the cap or closure member 30 has an opening 40 for receiving a bulb 42. The bulb 42 is threaded into the opening 40 by providing the end wall 38 at the periphery of the opening 40 with a formed slot 44 of sufficient width to enable the rolled external threads 46 on the plug or shank 48 of the bulb 42 to pass therethrough. The bulb 42 carries a contact 50 which engages a contact 52 of the battery 28 when the bulb 42 is snugly threadedly secured in the opening 40 in the cap or closure member 30. An expansion coil spring 54 desirably is carried in the closed-end portion 26 of the casing or housing 20. The spring 54 abuts the base of the battery 28 and urges the contact 52 thereof against the contact 50 of the bulb.

The end wall 58 of the closed-end portion 26 of the casing or housing 20 is provided with a central bore 60 which opens into a diametrical groove or slot 62. The groove or slot 62 receives a branch or arm 64 of a resilient signal actuating or switch assembly, designated generally at 66. The branch or arm 64 of the assembly 66 desirably has a bore therein corresponding in diameter to the bore 60 in the end wall 58 and conveniently is secured in the groove or slot 62 by means of a bolt 67 and a nut 69. In the arrangement illustrated, the head of the bolt 67 serves also to retain a coil of the spring 54 in abutting relation with respect to the inner surface of the end wall 58 to prevent displacement or dislodgement of the spring.

Joined to the branch or arm 64 of the assembly 66, as viewed in FIG. 1, is an elongated, circuit-completing, casing or housing overlying portion 68 which terminates in a downwardly and outwardly directed cap or closure member engaging contact 70. A short distance rearward of the contact 70, the portion 68 is joined to a laterally extending branch or arm 72 which is in substantially the same plane as the portion 68. At its outermost end, the branch or arm 72 is joined to a downwardly extending portion 74 which terminates at a point below the casing or housing 20 where it is joined to a substantially horizontal, rod overlying portion 76. The portion 76 is joined to a portion 78 which extends downwardly therefrom on the side of the fishing rod 12 opposite to that on which the portion 74 is situated. The portion 78 terminates at a point below the rod 12 where it is joined to a line engaging clip portion 80 which underlies the rod. The signal actuating or switch assembly 66 desirably is fabricated of a resilient electrically conductive metal, such as spring steel or Phosphor bronze or the like, and is formed from a single piece of metal to give it the strength and resiliency desired.

The casing or housing 20 and its associated signal actuating or switch assembly 66 are conveniently mounted on the rod 12 by a one-piece clamp 82. The clamp 82 has a rod engaging portion 84 provided with a single bolt 86 and nut 88 for easily and readily rigidly securing the device on the rod. The casing or housing engaging portion 90 of the clamp 82 has a generally hexagonal configuration and engages the straight-sided intermediate portion 24 of the casing or housing 20. This arrangement effectively prevents the casing or housing from rotating in the clamp 82. The clamp 82 further is provided with a web portion 92 which overlies an area of the portion 68 of the assembly 66 and provides a degree of protection against damage to the portion 68. The portion 92 of the clamp 82 advantageously carries a knurl-headed adjusting screw 94 which normally abuts the portion 68 of the assembly 66 and provides a convenient and effective means for regulating the contact 70 of the assembly 66 upwardly or downwardly with respect to the cap or closure member 30 to attain the sensitivity of operation desired to accommodate weather and water conditions, and/or the biting or striking characteristics of a particular type of fish.

An insulative cover member 100 advantageously is provided for the cap or closure member 30 and the bulb 42 carried thereby. The cover member 100 desirably is fabricated of a lightweight, electrically non-conductive, translucent or transparent material such as plastic, or the like. In the embodiment of the cover member 100 illustrated in FIG. 6, the open-end thereof has an inwardly extending annular lip 102 which, when the member 100 overlies the cap or closure member 30, snugly engages the periphery of the portion 22 of the casing or housing 20 adjacent the end of the side wall 32 of the cap or closure member 30. The cover member 100 further advantageously has a cut out portion 104 which enables the device selectively to be rendered operative or inoperative by simple rotation of the cover member 100, respectively, to expose a segment of the cap or closure member 30 to engagement by the contact 70, or to insulate the cap or closure member 30 from engagement by the contact 70. The inherent resiliency of the material of which the member 100 is fabricated desirably is such that removal of the member 30 will require a substantial pulling force while permitting the member 100 to be easily rotated on the casing or housing 20.

In operation, the device 10 is mounted on a flexible area of a fishing rod, as shown in FIG. 1, with the casing or housing 20 on the side of the rod opposite to the side thereof on which the fishing line is carried. The line is then engaged in the clip portion 80 of the signal actuating or switch assembly 66. The sensitivity of the device may, at this point, be adjusted as desired by appropriate turning of the screw 94. When a nibble, bite or strike is made by a fish, the line will become taut and the rod, concomitantly, will flex in response to the tension on the line. Tensioning of the line exerts a downward force on the assembly 66. Simultaneously therewith the flexure or bending of the rod causes the rod to exert an upward force to compensate for the force applied on it by the line. This combination of oppositely acting forces tends to increase the distance between the segment of the rod carrying the device and the line engaged in the portion 80 of the assembly 66, causing the contact 70 to be positively brought into engagement with the exposed area of the electrically conductive cap or closure member 30 to complete an electrical circuit to energize the bulb 42. This action will continue as long as the fish remains interested in the bait or lure, and each bite or strike made by the fish on the line will be detected by the device independent of the weather and water conditions prevailing at the time. Any excessive or abnormal stress or load applied to the line by a fish causes the portion 76 of the assembly 66 to engage the top of the rod. As a result, substantially the full force of the excessive or abnormal stress or load is effectively transmitted to the rod. In this manner, the circuit completing portion 68 of the assembly 66 is protected against forces which, in the absence of this self-protective feature of the assembly 66, could bend the portion 68 out of shape and thus adversely affect the operation of the device.

While the signalling or detecting device of the present invention has been described with reference to a specific illustrative embodiment, it should be understood that numerous modifications can be made in the preferred form of the invention above described without deviating from the broader aspects of the invention.

What is claimed is:

1. A device for attachment to a fishing rod, said device being capable of producing a signal to indicate the presence of a fish on a line associated with the fishing rod, comprising an insulative housing, a battery carried within said housing, an electrically conductive closure member for said housing, said closure member carrying in electrically conductive relation signal means in electrical contact with said battery, and resilient signal actuating means attached to said housing for engaging said line, a portion of said signal actuating means extending substantially longitudinally of the housing on the exterior thereof for making electrical contact with said closure member to complete an electrical circuit to said signal means in response to stresses placed on said line, another portion of said signal actuating means providing a shoulder for directly engaging the rod to prevent abnormal stresses placed on said line from being transmitted to said first mentioned portion of said signal actuating means.

2. A device for attachment to a flexible fishing rod, said device being capable of producing a signal to indicate the presence of a fish on a line associated with the fishing rod, comprising an insulative housing mounted on a flexible portion of the rod on the side thereof opposite to the line associated therewith, a battery carried within said housing, an electrically conductive closure member carrying in electrically conductive relation signal means in electrical contact with said battery, and resilient switch means attached to said housing and engaging said line on the side of the rod opposite to that on which said housing is mounted, said switch means having a portion thereof on the same side of the rod as said housing and extending longitudinally thereof for making electrical contact with said closure member to complete an electrical circuit to said signal means in response to the combined tautening of said line and the concomitant flexing of said rod, said switch means having another portion for engaging said line providing a shoulder for directly engaging the rod to prevent abnormal stresses placed on said line from being transmitted to said first mentioned portion of said switch means.

3. A device for attachment to a fishing rod, said device being capable of producing a signal to indicate the presence of a fish on a line associated with the fishing rod, comprising an insulative housing, a battery carried within said housing, an electrically conductive closure member for said housing, said closure member carrying in electrically conductive relation signal means in electrical contact with said battery, resilient signal actuating means attached to said housing for engaging said line, a portion of said signal actuating means extending substantially longitudinally of the housing on the exterior thereof for making electrical contact with said closure member to complete an electrical circuit to said signal means in response to stresses placed on said line, another portion of said signal actuating means providing a shoulder for directly engaging the rod to prevent abnormal stresses placed on said line from being transmitted to said first mentioned portion of said signal actuating means, means for detachably mounting said device on a fishing rod, and means carried by said last mentioned means for adjusting the relative distance between said first mentioned portion of said signal actuating means and said electrically conductive closure member.

4. A device for attachment to a fishing rod, said device being capable of producing a signal to indicate the presence of a fish on a line associated with the fishing rod, comprising an insulative housing, a battery carried within said housing, an electrically conductive closure member for said housing, said closure member carrying signal means in electrical contact with said source of electrical energy, resilient signal actuating means attached to said housing for engaging said line, a portion of said signal actuating means extending substantially longitudinally of the housing on the exterior thereof for making electrical contact with said closure member to complete an electrical circuit to said signal means, another portion of said signal actuating means partially surrounding a segment of the fishing rod adjacent the device and providing a shoulder for engaging the rod to prevent abnormal stresses placed on said line from being transmitted to said first mentioned portion of said signal actuating means, and an insulative cover member for said closure member, said cover member being adjustable on said closure member to prevent said first mentioned portion of said signal actuating means from making electrical contact with said closure member when the device is not in use.

5. A device for attachment to a fishing rod, said device being capable of producing a signal to indicate the presence of a fish on a line associated with the fishing rod, comprising an insulative housing, a battery carried within said housing, an electrically conductive closure member releasably attached to one end of said housing, said closure member having a bulb threadedly engaged thereon in electrical contact with said battery, and resilient signal actuating means attached to said housing for engaging said line, a portion of said signal actuating means overlying said housing in spaced relation thereto and extending substantially longitudinally of the housing for making electrical contact with said closure member to complete an electrical circuit to said bulb, another portion of said signal actuating means partially surrounding a segment of the fishing rod adjacent the device and providing a shoulder for engaging the rod to prevent abnormal stresses placed on said line from being transmitted to said first mentioned portion of said signal actuating means.

6. A device for attachment to a flexible fishing rod, said device being capable of producing a signal to indicate the presence of a fish on a line associated with the fishing rod, comprising an insulative housing mounted on a flexible portion of the rod on the side thereof opposite to the line associated with the rod, a battery carried within said housing, an electrically conductive closure member releasably attached to one end of said housing, said closure member having a bulb threadedly engaged thereon in electrical contact with said battery, resilient switch means attached to said housing and engaging said line on the side of the rod opposite to that on which said housing is mounted, said switch means having a portion overlying said housing in spaced relation thereto and extending substantially longitudinally of the housing for making electrical contact with said closure member to complete an electrical circuit to said bulb, said switch means having another portion for engaging said line providing a shoulder for directly engaging the rod to prevent abnormal stresses placed on said line from being transmitted to said first mentioned portion of said switch means, a clamp for detachably mounting said device on a fishing rod, a portion of said clamp overlying said portion of the switch means, and means carried on said portion of the clamp normally in contact with said portion of the switch means for adjusting the relative distance between said portion of the switch means and said electrically conductive closure member.

7. A device for attachment to a flexible fishing rod, said device being capable of producing a signal to indicate the presence of a fish on a line associated with the fishing rod, comprising an insulative housing mounted on a flexible portion of the rod on the side thereof opposite to the line associated with the rod, a battery carried within said housing, an electrically conductive cap member releasably secured on one end of said housing, said cap member having a bulb threadedly engaged thereon in electrical contact with said battery, resilient switch means attached to the other end of said housing and engaging said line on the side of the rod opposite to that on which said housing is mounted, said switch means having a portion overlying said housing in spaced relation thereto and extending substantially longitudinally of the housing for making electrical contact with said cap member to complete an electrical circuit to said bulb, said switch means having another portion partially surrounding a segment of the fishing rod adjacent the device and providing a shoulder positioned above the rod and transverse to the longitudinal axis thereof for engaging the rod to prevent abnormal stresses placed on said line from being transmitted to said first mentioned portion of said switch means, a clamp for detachably mounting said device on a fishing rod, a portion of said clamp overlying said first mentioned portion of the switch means, an adjustable member carried on said portion of the clamp normally in contact with said first mentioned portion of said switch means for regulating the relative distance between said first mentioned portion of the switch means and said cap member, and an insulative cover member for said cap member and said bulb, said cover member being adjustable on said closure member to prevent said first mentioned portion of said switch means from making electrical contact with said closure member when the device is not in use.

References Cited by the Examiner
UNITED STATES PATENTS

| | | | |
|---|---|---|---|
| 2,643,371 | 6/53 | Sleeger | 43—17 X |
| 2,858,635 | 11/58 | Haeusler | 43—17 |
| 3,027,675 | 4/62 | Parsons | 43—17 |

FOREIGN PATENTS 463,794  3/50  Canada.

ABRAHAM G. STONE, *Primary Examiner.*